(12) United States Patent
Ivanine (10) Patent No.: US 9,872,488 B2
(45) Date of Patent: Jan. 23, 2018

(54) GAS PORTAL FOR A STRUCTURE AND METHOD FOR INSTALLING THE SAME

(75) Inventor: Serguei Ivanine, New South Wales (AU)

(73) Assignee: Asiaworld Shipping Services PTY LTD, New South Wales (AU)

( * ) Notice: Subject to any disclaimer, the term of this patent is extended or adjusted under 35 U.S.C. 154(b) by 1146 days.

(21) Appl. No.: 13/578,093

(22) PCT Filed: Feb. 9, 2011

(86) PCT No.: PCT/AU2011/000130
§ 371 (c)(1),
(2), (4) Date: Oct. 24, 2012

(87) PCT Pub. No.: WO2011/097671
PCT Pub. Date: Aug. 18, 2011

(65) Prior Publication Data
US 2013/0040552 A1    Feb. 14, 2013

(30) Foreign Application Priority Data
Feb. 9, 2010   (AU) .................................. 2010900518

(51) Int. Cl.
*B23P 17/04*    (2006.01)
*A01M 13/00*   (2006.01)
*A23L 3/3409*  (2006.01)

(52) U.S. Cl.
CPC ......... *A01M 13/003* (2013.01); *A23L 3/3409* (2013.01); *Y10T 29/49826* (2015.01)

(58) Field of Classification Search
CPC .. E06B 9/52; E06B 2009/528; A01M 13/003; A23L 3/3409; Y10T 29/49826

USPC ... 454/63, 66, 174, 195, 212, 214, 222, 225, 454/228, 234, 237, 241, 339, 357, 358, 454/370; D08/402; 119/677
See application file for complete search history.

(56) References Cited

U.S. PATENT DOCUMENTS

| | | | |
|---|---|---|---|
| 2,701,515 A * | 2/1955 | Rinker ......................... 454/212 |
| 4,738,053 A * | 4/1988 | Biesenthal ....................... 49/70 |
| 6,550,828 B2 * | 4/2003 | Warden ......................... 292/288 |
| 2003/0009954 A1 * | 1/2003 | Bradley ......................... 52/79.1 |
| 2007/0163435 A1 * | 7/2007 | Brash ............................... 95/90 |

(Continued)

FOREIGN PATENT DOCUMENTS

| | | | | |
|---|---|---|---|---|
| CN | 1476294 | | 2/2004 | |
| DE | 29604407 | * | 6/1996 | ............... F24F 1/04 |
| DE | 202008016773 | * | 4/2003 | ............... E06B 7/28 |

(Continued)

OTHER PUBLICATIONS

Butterfield, Richard, "First Examination Report", IP No. 602131, dated Feb. 20, 2013 (2 pages).

(Continued)

*Primary Examiner* — Gregory Huson
*Assistant Examiner* — Dana Tighe
(74) *Attorney, Agent, or Firm* — Fish & Richardson P.C.

(57) ABSTRACT

A device (10) is disclosed. It has a gas impervious barrier (12) configured to be located between an opening of a container (16) and a door (18) arranged to close the opening. There is a passageway (14) through the barrier, the passageway (14) providing a pathway between the interior and exterior of the container (16) for a gas.

23 Claims, 12 Drawing Sheets (56) References Cited

U.S. PATENT DOCUMENTS

2009/0272024 A1* 11/2009 Rogacki et al. ............... 43/125

FOREIGN PATENT DOCUMENTS

| EP | H02-303442 | 12/1990 |
|----|------------|---------|
| EP | 0 457 431 | 11/1991 |
| NZ | 523564 | 5/2003 |
| NZ | 547639 | 12/2007 |
| WO | WO 00/31478 | 6/2000 |
| WO | WO 2000/062607 | 10/2000 |
| WO | WO 2005/056425 | 6/2005 |
| WO | WO 2006/092008 | 9/2006 |
| WO | WO 2006/116809 | 11/2006 |
| WO | WO 2007/036000 | 4/2007 |
| WO | WO 02/03797 | 1/2012 |

OTHER PUBLICATIONS

AU Patent Appln. No. 2011214891; First Office Action dated May 16, 2014; 3 pp.
Cromwel Flores, "International Search Report", International Application No. PCT/AU2011/000130, dated Mar. 30, 2011 (3 pages).
Cromwell Flores, "Written Opinion of the International Searching Authority", International Application No. PCT/AU2011/000130, dated Mar. 30, 2011 (4 pages).
Cromwell Flores, "International Preliminary Report on Patentability", International Application No. PCT/AU2011/000130, completed Apr. 10, 2012 (18 pages).
Notice of First Office Action; CN 2011800108256; dated Dec. 18, 2013.
European Supplementary Search Report issued in corresponding EP Application No. 11741746.9 dated Nov. 24, 2017, 10 pages.

* cited by examiner

GAS PORTAL FOR A STRUCTURE AND METHOD FOR INSTALLING THE SAME

FIELD OF THE INVENTION

The present invention generally relates to a device for locating at an opening of a structure, the device providing a pathway between the interior and exterior of the structure for a gas, and particularly but not exclusively to such a device having a wedged shaped member complementary to a space between the opening and a respective door when the door is ajar.

BACKGROUND OF THE INVENTION

Many structures, such as silos, factories, houses and shipping containers are subjected to fumigation. Fumigants such as methyl bromide, however, are highly toxic and may damage the health of those exposed to the gas. Methyl bromide damages the ozone layer if released into the atmosphere. A fumigant, typically in the form of a gas, is ideally introduced into the structure while maintaining a seal against the leakage of the fumigant at the point the fumigant is introduced.

Toxic gases may build up inside a structure. For example, the contents of a shipping container (especially freight containers, otherwise known as intermodal containers) may release toxic gases. The toxic gas may originate from a constituent of the contents (such as a varnish finish). Alternatively, the toxic gas may be a fumigant absorbed or adsorbed during fumigation of the container's contents, typically at the port from which the container departed, and then released during the shipping period. It is desirable to remove any residual gases, such as toxic gases, from the container before a person enters it or even, in some circumstances, substantially opened.

SUMMARY OF INVENTION

According to a first aspect of the invention, there is provided a device comprising:

a gas impervious barrier configured to be located between an opening of a structure and a door arranged to close the opening;

a passageway through the barrier, the passageway providing a pathway between the interior and exterior of the structure for a gas.

According to a second aspect of the invention there is provided a device comprising:

a gas impervious barrier configured to be located between an opening of a structure and a door attached to the structure at a pivot located adjacent the opening, the barrier having a wedge shaped member complementary to a space between the opening and the door when the door is ajar; and a passageway through the barrier, the passageway providing a pathway between the interior and exterior of the structure for a gas.

The devices of the first and second aspects may be each referred to as a gas portal for a structure.

In an embodiment, the wedge shaped member is one of two spaced apart wedge shaped members each pointing in the same direction. A gas tight seal may extend between distal ends of the two wedges.

In an embodiment, the barrier further comprises a portion having opposite ends. The portion may comprise a spine. Each of the ends may be attached adjacent a thick end of a respective one of the wedge shaped members. A C like shape may be formed. The wedge shaped members and the portion may define a gas seal between the opening and the door.

In an embodiment, the device has opposing spine that opposes the spine.

In an embodiment, the device may comprise stiffening elements. The wedge shaped members may each comprise a stiffening element. The portion may comprise a stiffening element.

In an embodiment, the passageway apposes a thin end of the wedge, shaped member. The passageway may pass through the portion.

In an embodiment, the passageway comprises a pipe. At least a portion of the pipe may project away from the barrier in the direction opposite that which the wedge shaped member points.

In an embodiment, the passageway comprises a pipe directed out of a plane of the wedge shaped member and into the interior of the structure. Alternatively, the passageway does not comprise a pipe. The passageway may comprise a hole, such as for example a hole formed by boring or cutting through the barrier.

In an embodiment, the pipe is attached to one of the stiffening elements. Alternatively, the pipe is not attached to one of the stiffening elements.

In an embodiment, the passageway is one of two passageways through the barrier. One of the passageways may be a gas inlet for the introduction of a gas into the structure. The other passageway may be a gas outlet for the extraction of a gas from the structure.

In an embodiment, the device is adapted to be assembled from component parts.

In an embodiment, the device, when assembled, resembles a perimeter portion of a wedge.

In an embodiment, the device is configured to suit an intermodal (freight) container. The device may be configured for ISO containers, as defined by the ISO 6346 standard.

According to a third aspect of the invention there is provided a method of installing a gas portal on a structure, the method comprising the steps of:

opening a door of the structure to reveal a structure opening;

locating at the opening a gas impervious barrier configured to be located between the opening and the door, the barrier having a passageway providing a pathway between the interior and exterior of the structure for a gas; and closing the door until it abuts the barrier.

According to a fourth aspect of the invention there is provided a method of installing a gas portal on a structure, the method comprising the steps of:

opening a door attached to the structure at a pivot located adjacent an opening of the structure to reveal the opening;

locating a device defined by any one of claims 1 to 15 at the opening; and closing the door until it abuts the barrier.

According to a fifth aspect of the invention there is provided a fumigation system, the system comprising:

a device according to any one of the preceding aspects of the invention; and a fumigant source in communication with the device.

In an embodiment the fumigant source comprises a fan.

In an embodiment, the fumigant source may comprise a vessel for holding the fumigant.

In an embodiment, the system comprises an extraction unit in communication with the device, wherein in use the extraction unit extracts fumigant from a structure to which the device is installed. The extraction unit may comprise a filter that can absorb the extracted fumigant. The filter may comprise activated carbon. The filter may comprise a filter bed. Alternatively, the fumigant may be vented to atmosphere.

According to a sixth aspect of the invention there is provided a residual gas removal system comprising:

a device according to any one of the preceding aspects of the invention; and a flushing gas unit in communication with the device and configured to cause a flushing gas to flow through the passageway.

In an embodiment, the flushing gas unit may comprise a fan.

In an embodiment, the flushing gas is air. The flushing gas unit may cause the air to be drawn through the passageway.

In embodiments of any one of the above aspects of the invention, the structure is an intermodal (freight) container, such as a shipping container defined by the ISO 6346 standard (commonly referred to as an ISO shipping container). The opening may be an end door opening of the ISO shipping container.

BRIEF DESCRIPTION OF THE FIGURES

In order to achieve a better understanding of the nature of the present invention embodiments will now be described, by way of example only, with reference to the accompanying figures in which.

DETAILED DESCRIPTION OF EMBODIMENTS OF THE INVENTION

Figure 1:
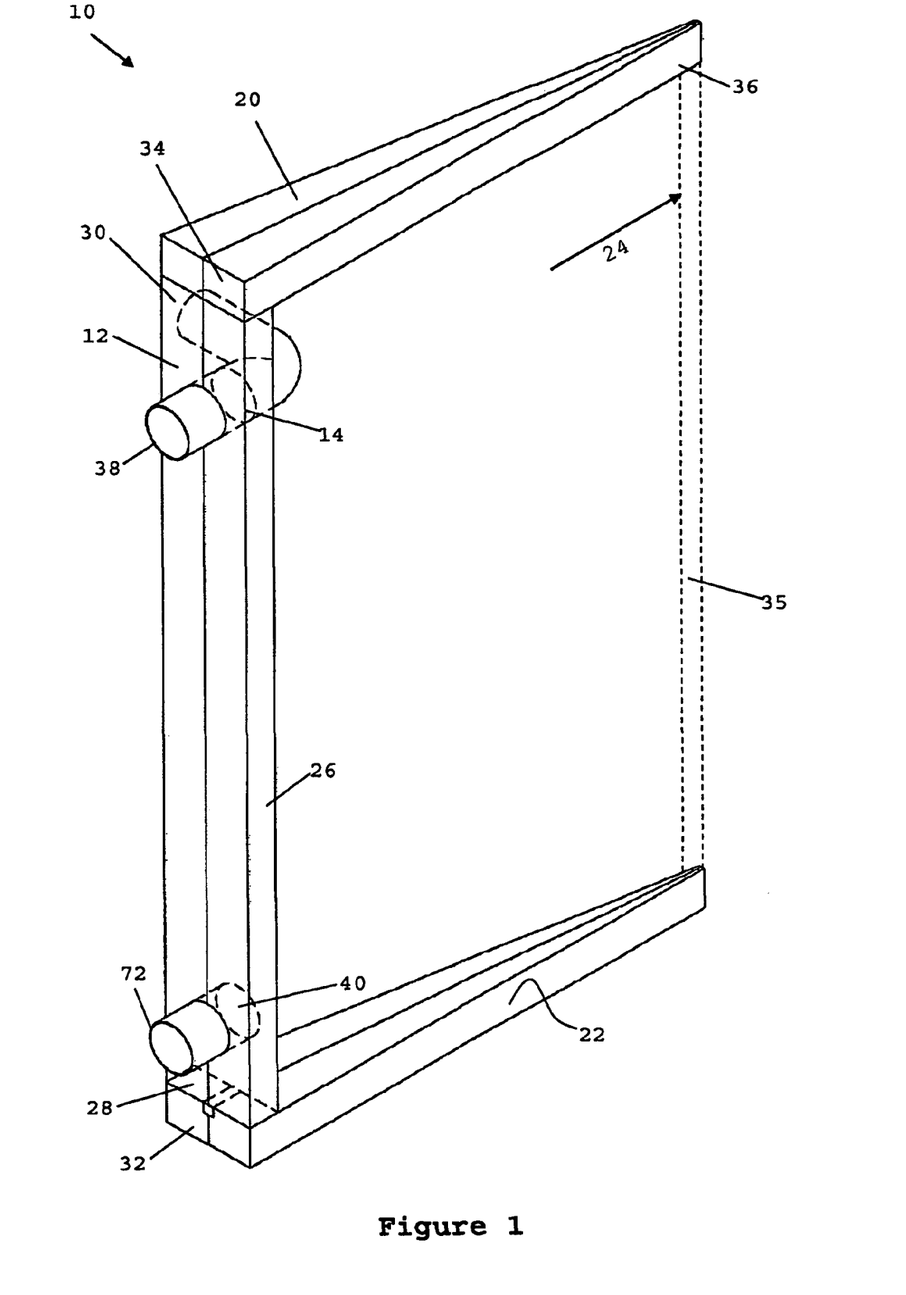
FIG. 1 shows a perspective view of an embodiment of a device according to one aspect of the invention.

FIG. 1 shows a perspective view of an embodiment of a device which is generally indicated by the numeral 10. The device 10 has a gas impervious barrier 12. A passageway 14 extends through the barrier 12. The passageway 14 provides a pathway for a gas, such as a fumigant or a residual gas, through the barrier 12.

Figures 2, 3:
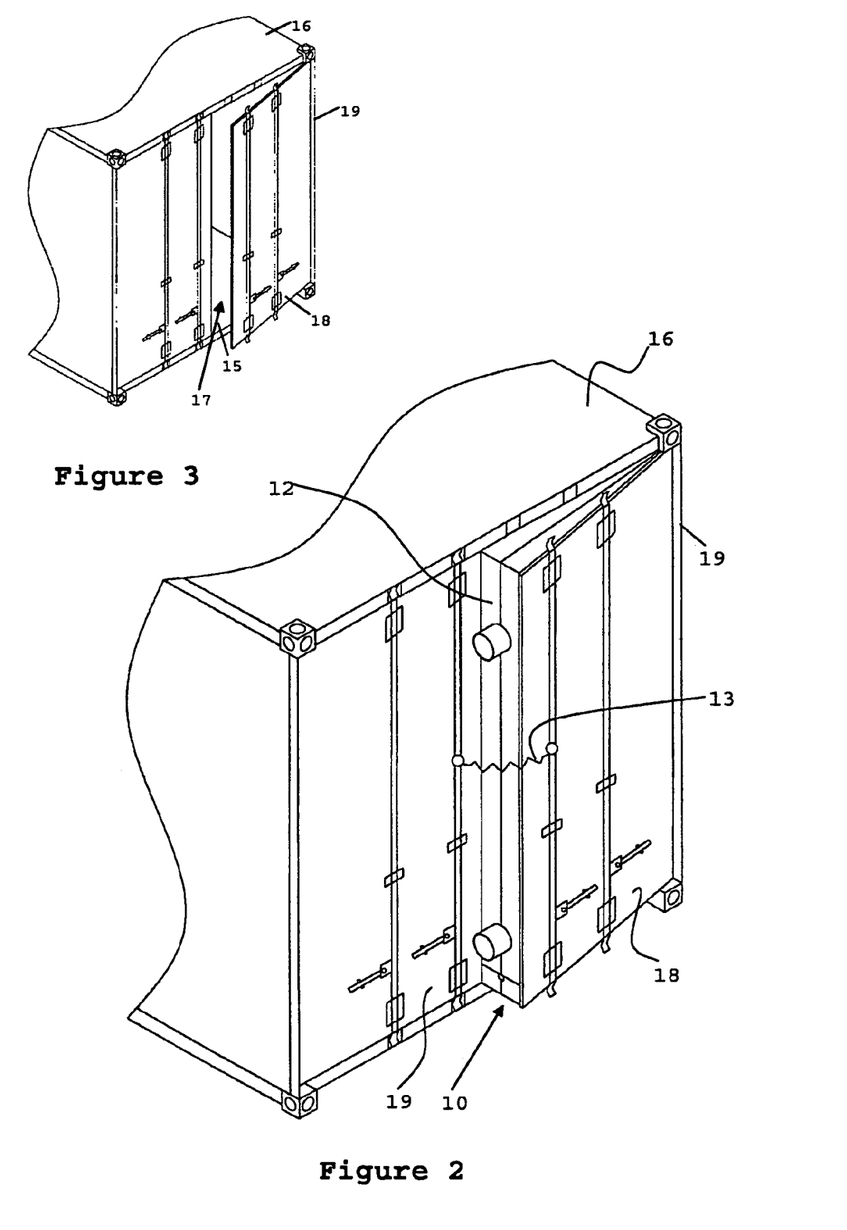
FIG. 2 shows a perspective view of the device of FIG. 1 installed on a structure.
FIG. 3 shows a perspective view of the structure shown in FIG. 2 with a door ajar.

FIG. 2 shows a perspective view of the device 10 installed on a structure, in this case an intermodal container, specifically an ISO shipping container 16. The device may, however, be installed on other structures such as at a factory, house or silo door or hatch. When the device is installed on the shipping container 16 a gas may flow between the interior and exterior of the structure without substantial leakage of the gas into the atmosphere (or in the case that the structure is located in a building, into the air within the building). The gas may, for example, be a fumigant such as any one of methyl bromide, phosphine, and sulfuryl fluoride introduced into the structure, a flushing gas (such as air from the atmosphere) to flush out fumigant from the structure after a fumigation cycle, a residual gas (such as might degas from product inside the structure or residual fumigant from a fumigation cycle), or air heated to a sufficient temperature to kill vermin within the container 16. The device may be described as a gas portal.

To install the device 10 a door 18 of the container 16 is opened to reveal an end door opening 15 of the container as illustrated in FIG. 3. In this example, the door 18 is attached to the container 16 at a pivot 19 located adjacent the opening and the door is opened by swinging it around the pivot. In another embodiment, however, the door is not swung around a pivot but may be removed altogether from the container. The device 10 is then located at the opening. The door is then closed until it abuts the barrier. The door is then fastened shut using, for example, a length of elastic cord 13 fastened at one end to the door 18 and the other end to the other door 19. A seal is formed between the edge of the opening and the barrier 12 and also the barrier 12 and the door 18. The barrier 12 may define a gas seal between the opening and the door. The barrier may comprise a material suitable for the formation of such a seal, such as natural or synthetic rubber, silicon, or any suitable polymer. Typically, the material is resilient.

The device 10 is configured to be located between the opening and the door 18. In this embodiment, the barrier has a wedge shaped member 20 complementary to a space 17 between the opening and the door 18 when the door is ajar. It will be understood that a wedge shaped space is naturally formed when a door is left ajar and the space may be exploited by placing a wedge shaped object in that space. In this embodiment, the wedge shaped member is actually one of two spaced apart wedge shaped members. The other member is indicated by numeral 22. Each wedge shaped member 20,22 is pointing in the same direction indicated by arrow 24. The wedge shaped members are, at least in this embodiment, each a piece of synthetic foam.

The device further has a spine portion 26 having opposite ends 28 and 30. Each of the ends 28,30 may be attached adjacent a thick end 32,34 of a respective one of the wedge shaped members 22,24. In this embodiment the wedge shaped members project laterally from the spine. A C like shape is formed, as shown in FIG. 1, by the wedge shaped members 20,22 connected by the elongate portion 26. The device 10 resembles a perimeter of a wedge. The device 10 is configured to fit a rectangular opening, however it will be appreciated other embodiments may be configured differently to match other types of openings such as round hatches. In this case, the wedge may be shaped like a circle or crescent. In the embodiment of FIG. 1, an optional gas tight seal 35 extends between distal ends of the wedges for extra sealing adjacent the hinge of the door and the associated gap thereat. The seal 35 may be useful during fumigation or other applications where toxic or environmentally harmful gases may be used.

The passageway 14 opposes a thin end 36 of the wedge shaped member 20. In this embodiment, the passageway 14 passes through the portion 12 at a thick end opposite the thin end because this allows the use of the widest passageway. The passageway may, however, pass through the wedge member 20 at any suitable point along it.

The passageway 14 comprises, in this but not necessarily all embodiments, a pipe 38 that projects away from the barrier 12 in the direction opposite that which the wedge shaped members 20,22 point. The pipe can be fitted to a hose for further transport of the gas through the pipe. The pipe may, for example, be inserted into an end of the hose and the hose clamped onto the pipe using a hose clamp or other constricting collar. The pipe also projects away from the in the direction that the wedge shaped member points, and then turns so that it is directed out of a plane of the wedge shaped member 20 and into the interior of the container.

The passageway, in this embodiment, is actually one of two passageways 14,40 through the barrier. The provision of two passageways allows for the continuous flow of a gas through the container. One of the passageways may be a gas inlet 14 for the introduction of a gas into the structure. The other passageway may be a gas outlet 40 for the extraction of a gas from the structure. At least the extraction passageway 40 is in use located at the bottom of the opening, at least in this embodiment. This enhances fumigant removal because many fumigants sink. The device may be configured such that in use the extraction passageway is located at the bottom of the opening.

Figure 4:
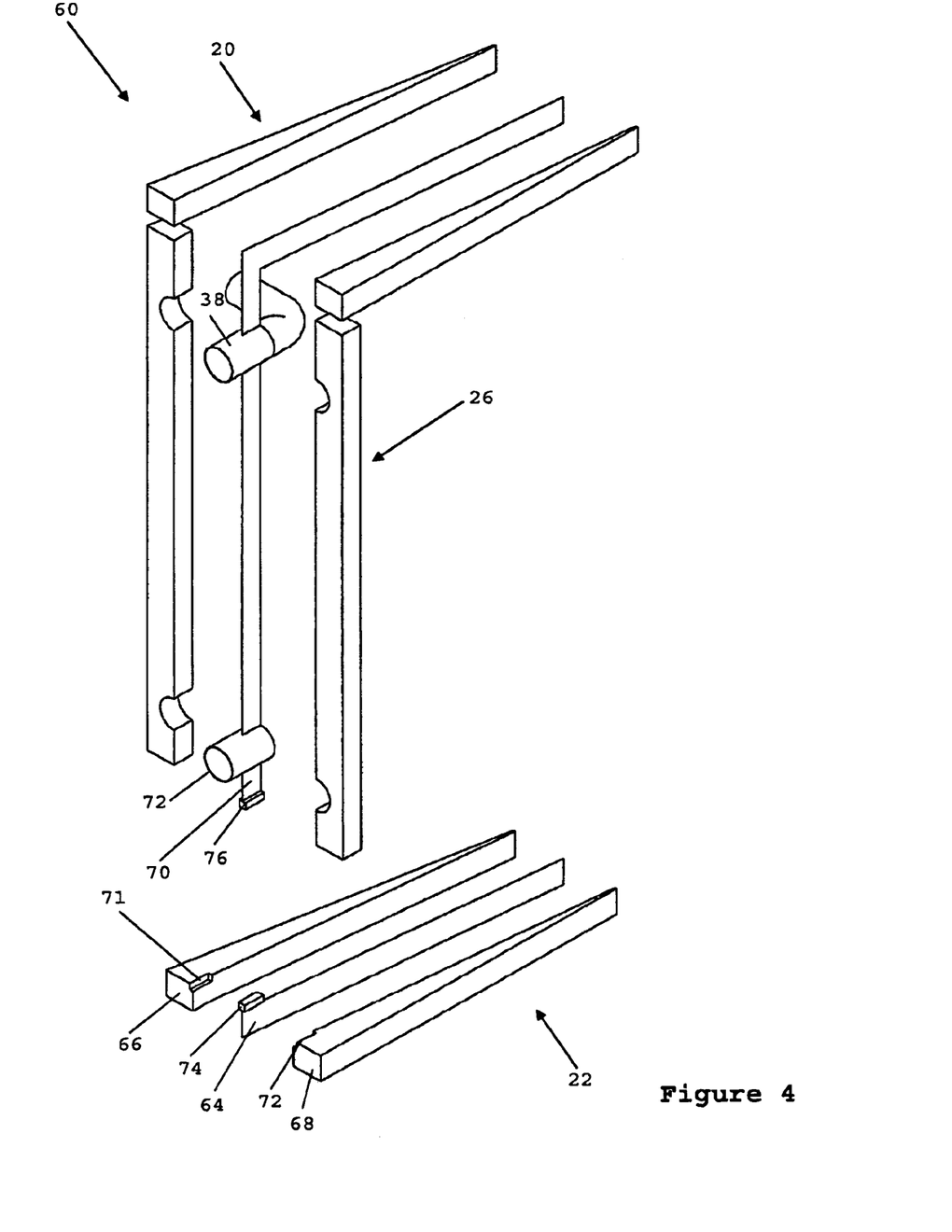
FIG. 4 shows a perspective view of component parts of the device of FIG. 1.

FIG. 4 shows a perspective view of the component parts, generally indicated by the numeral 60, of the device 10. The device 10 is adapted to be assembled from the component parts. The bottom wedge member 22 has an element 64 sandwiched between two wedge portions 66,68. The element 64 stiffens the wedge member 22 and so may be described as a stiffening element. The element 64 is typically made of mild steel but may be fabricated of any suitable material. The top wedge member 20 and portion 26 are similarly constructed. Stiffening element 70 has pipes 38 and 72 attached thereto to ensure their proper placement and to provide structural support thereto. The stiffening elements 70 and 64 have respective abutment portions 76,74. The abutment portions abut when the device 10 is assembled. They have dimensions large enough to ensure the ends of the stiffening elements do not inadvertently slip past each other during use. The wedge portions 66,68 have recesses 71,72 in which the abutment portions are located.

The assembly 60 may be brought together to form the device 10 and the assembly fastened using any suitable means such as mechanical fasteners, screws, glue, or ties for example.

Figure 5:
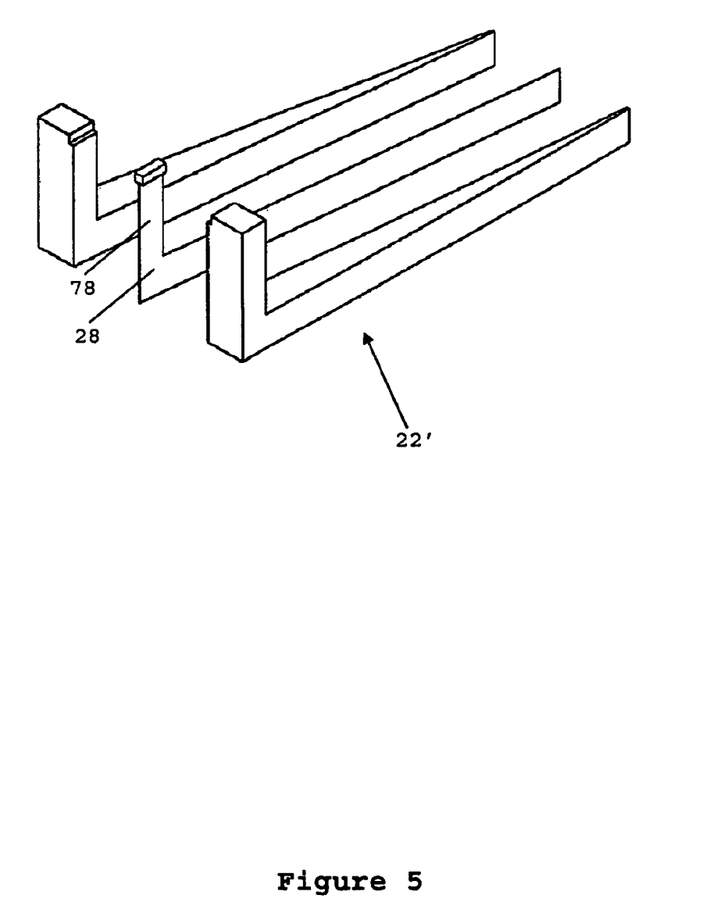
FIG. 5 shows a perspective view of another version of a bottom wedge member.
Figure 6:
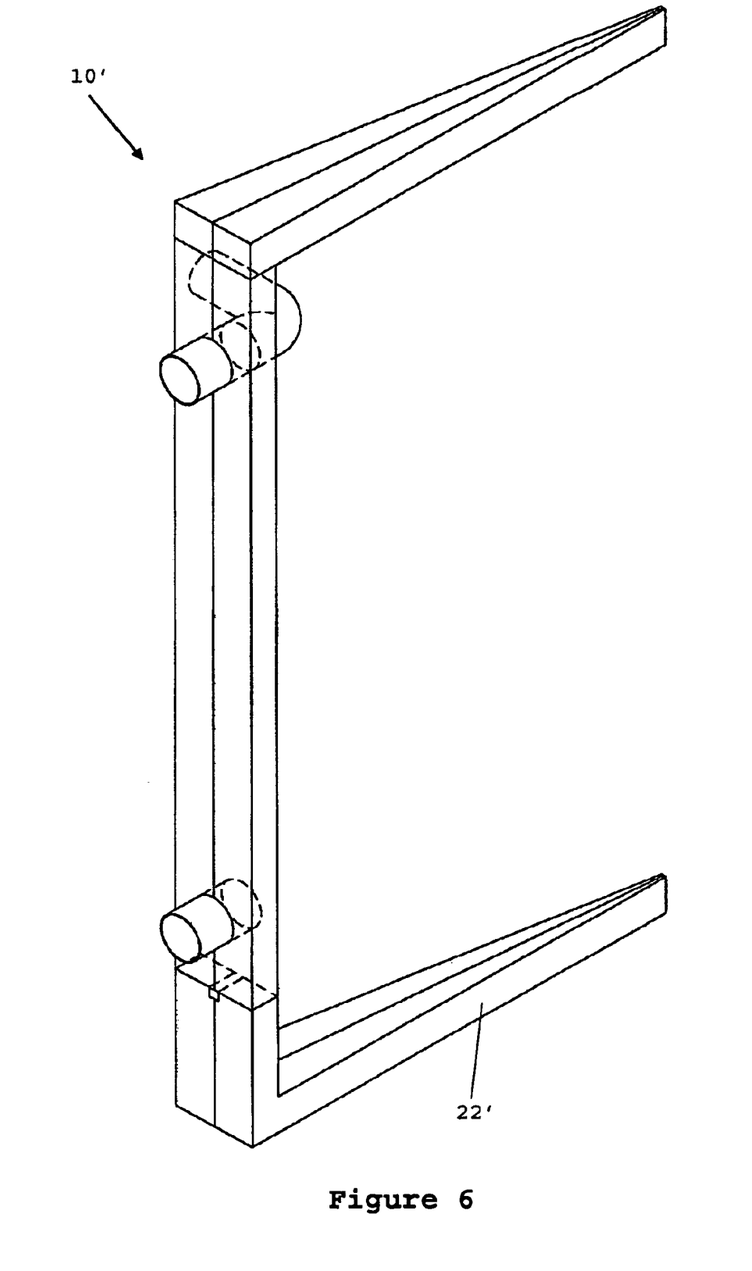
FIG. 6 shows a perspective view of another embodiment of the device.

FIG. 5 shows a perspective view of another version of a bottom wedge, member that may be used, indicated by the numeral 22'. This wedge has a vertical stiffening member 78 for use with taller openings. FIG. 6 shows a perspective view of another embodiment of the device generally indicated by the numeral 10' having the bottom wedge member 22' shown in FIG. 5.

Figure 7:
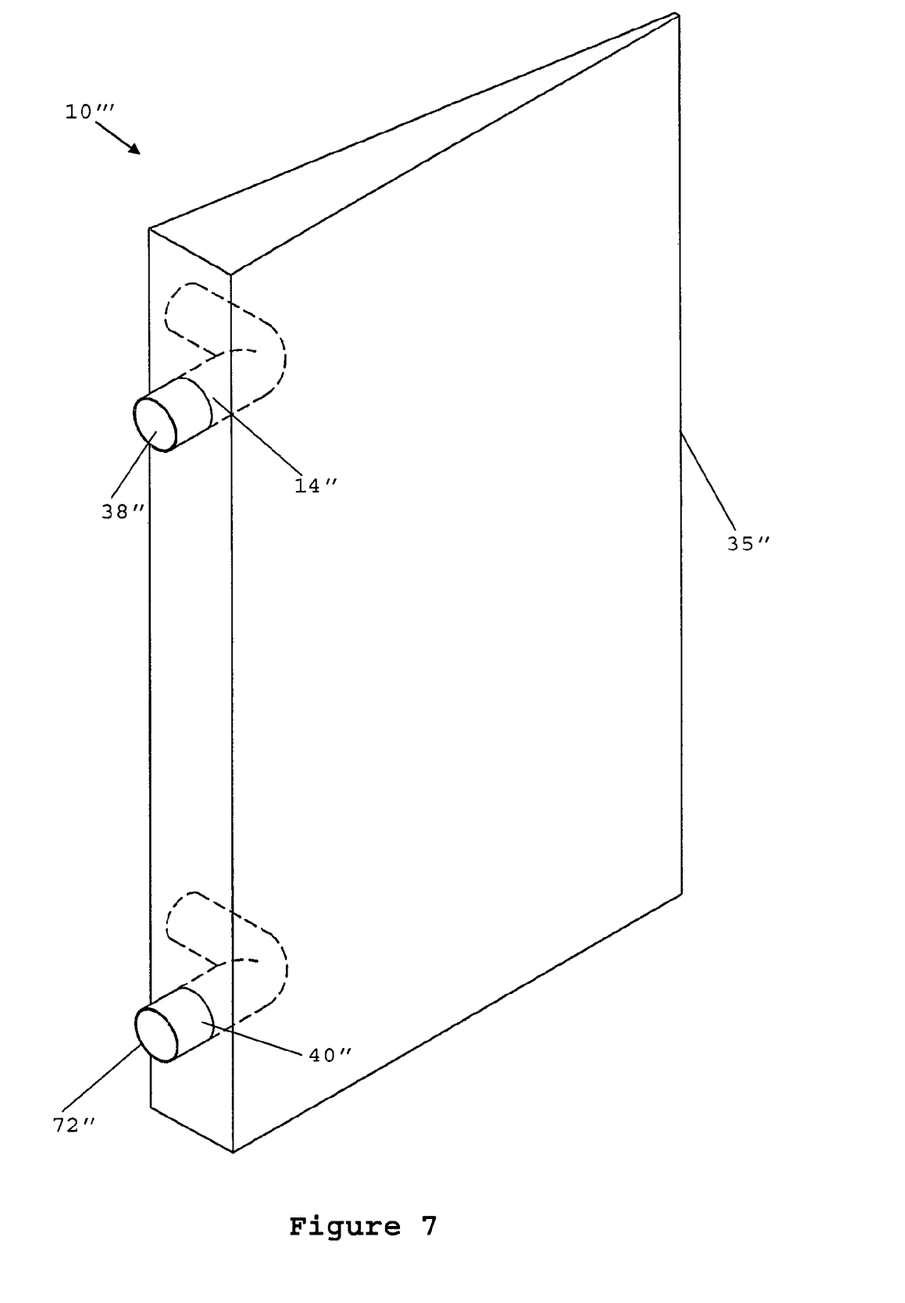
FIG. 7 shows a perspective view of another embodiment of a device.
Figure 8:
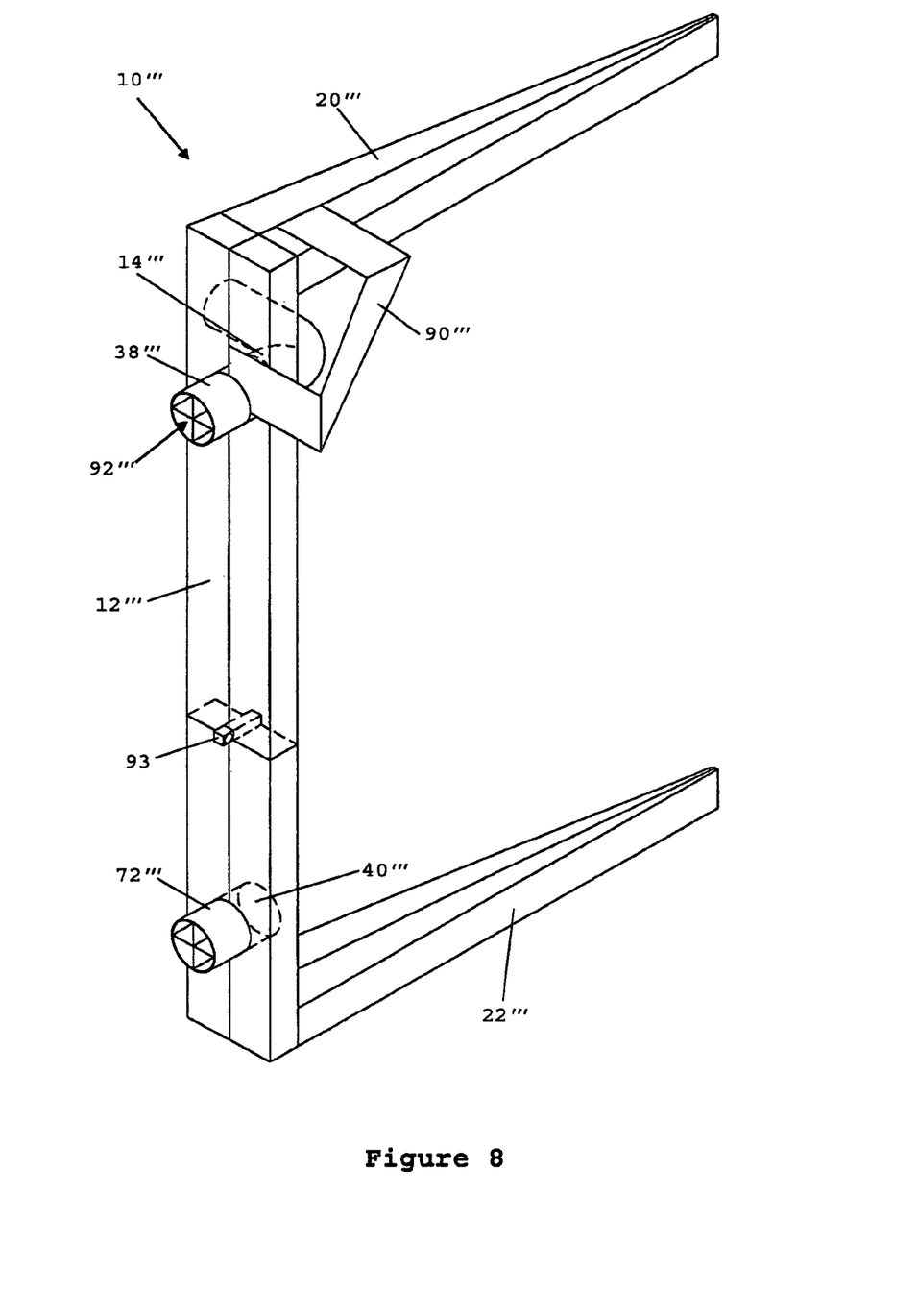
FIGS. 8 to 11 show various views of another embodiment of a device according to an aspect.
Figure 9:
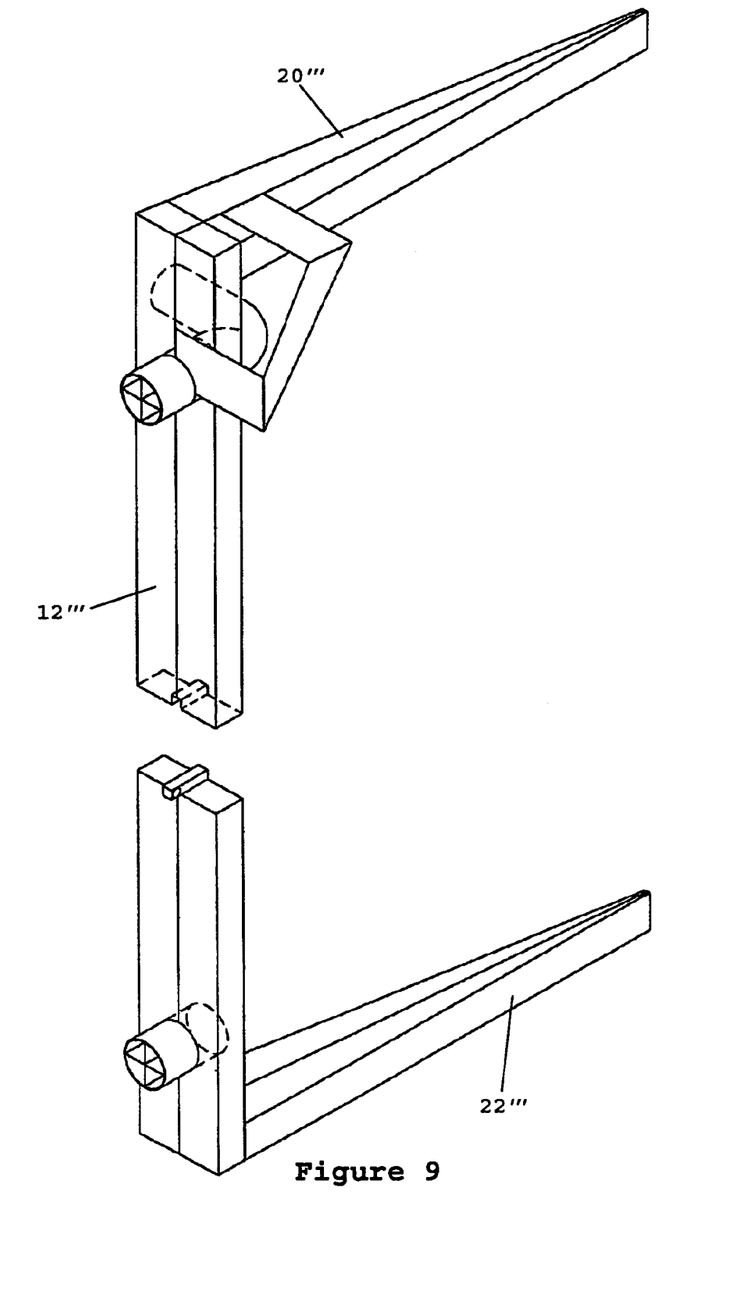
Figure 10:
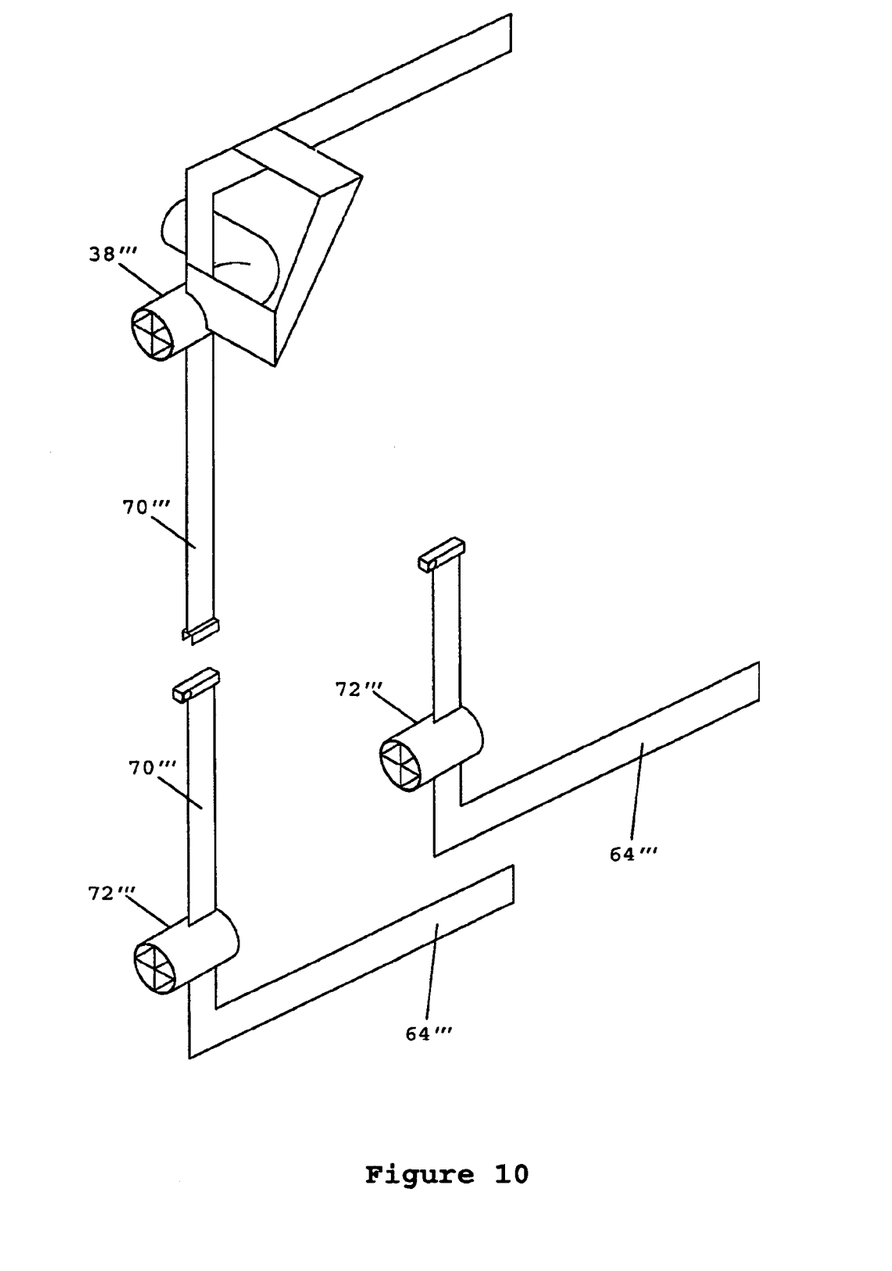
Figure 11:
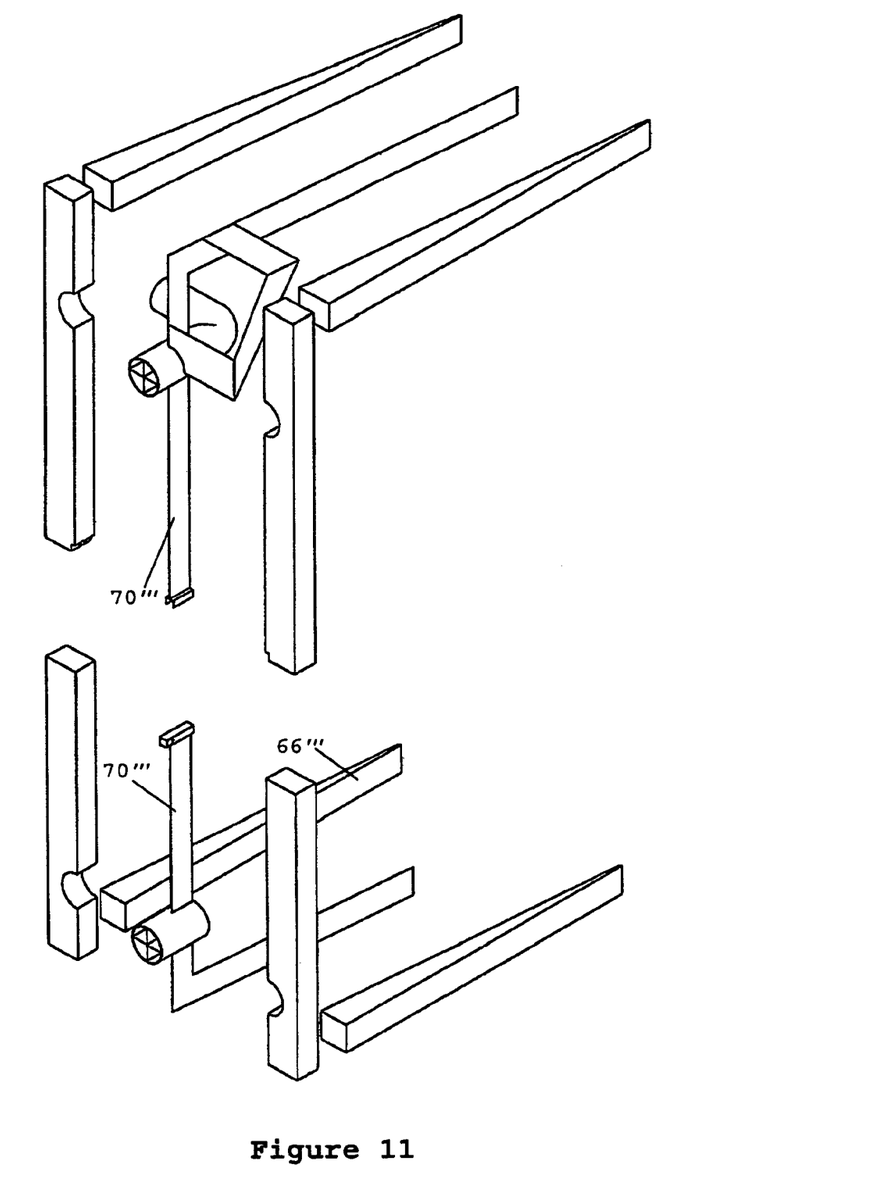

FIG. 7 shows a perspective view of another embodiment of a device generally indicated by 10" and in which parts similar to those described are similarly numbered. In this embodiment the device comprises a wedge of synthetic foam presenting an area similar to that of the opening and having a pair of passageways 14",40" passing therethrough. The thin end of the wedge 35" forms a gas tight seal adjacent the hinges of the door (and associated gaps) when installed.

Figure 12:
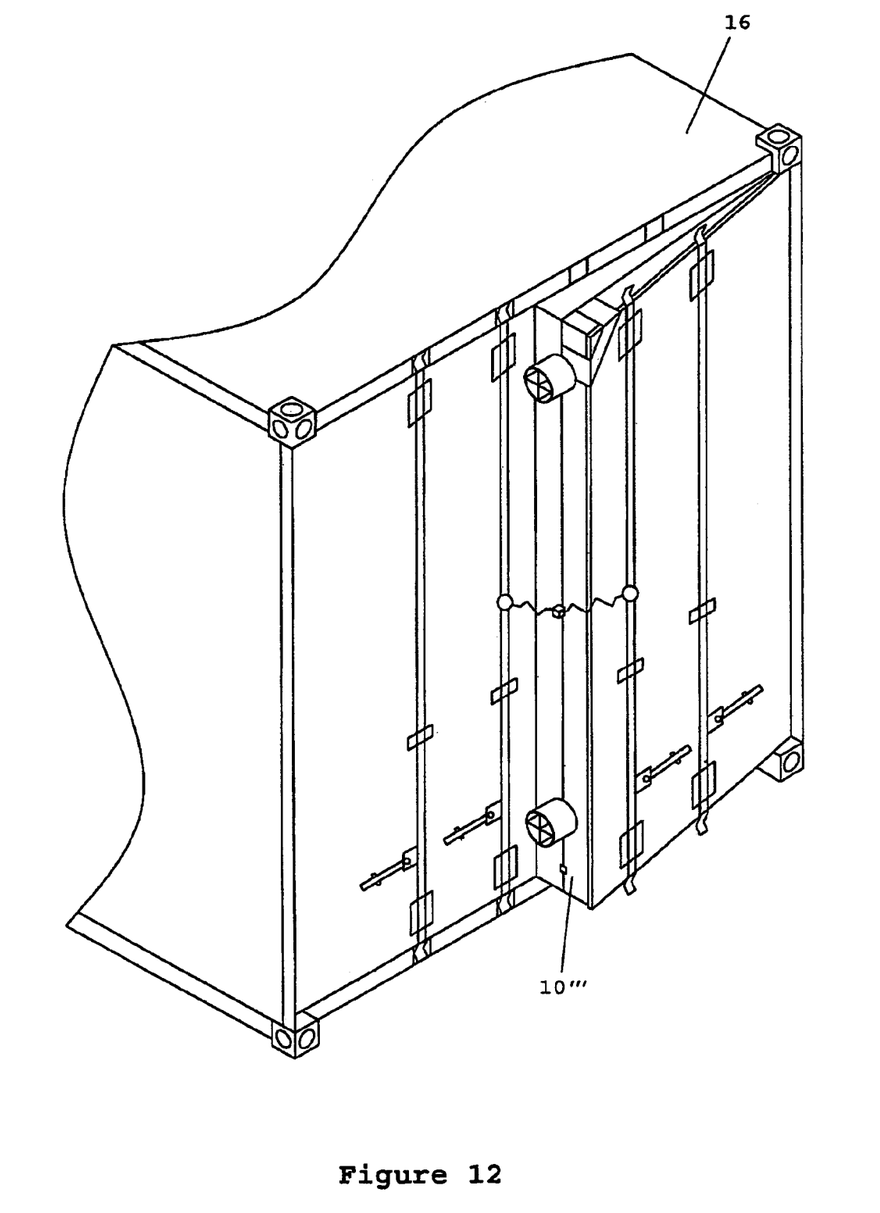
FIG. 12 shows the device of FIGS. 7 to 10 installed on a ISO shipping container.

FIGS. 8 to 11 show various views of another embodiment of a device according to an aspect of the invention. FIG. 12 shows the device of FIGS. 8 to 11 installed on an ISO shipping container. The device is generally indicated by the numeral 10''' and parts similar to those previously described similarly numbered. This embodiment of a device 10 is configured to hang on a door, for example an ISO shipping container door. A hanger 90''' is provided for this. There is also a structure in the form of cross members such as 92''' within the pipes to impede free movement into the pipe, such as 38''' to prevent small items entering the pipe. There is also a security feature 93 having an aperture through which a chain or the like can pass to secure the device to the container and simultaneously fasten the door of the container firmly to the device 10'''.

Figure 13:
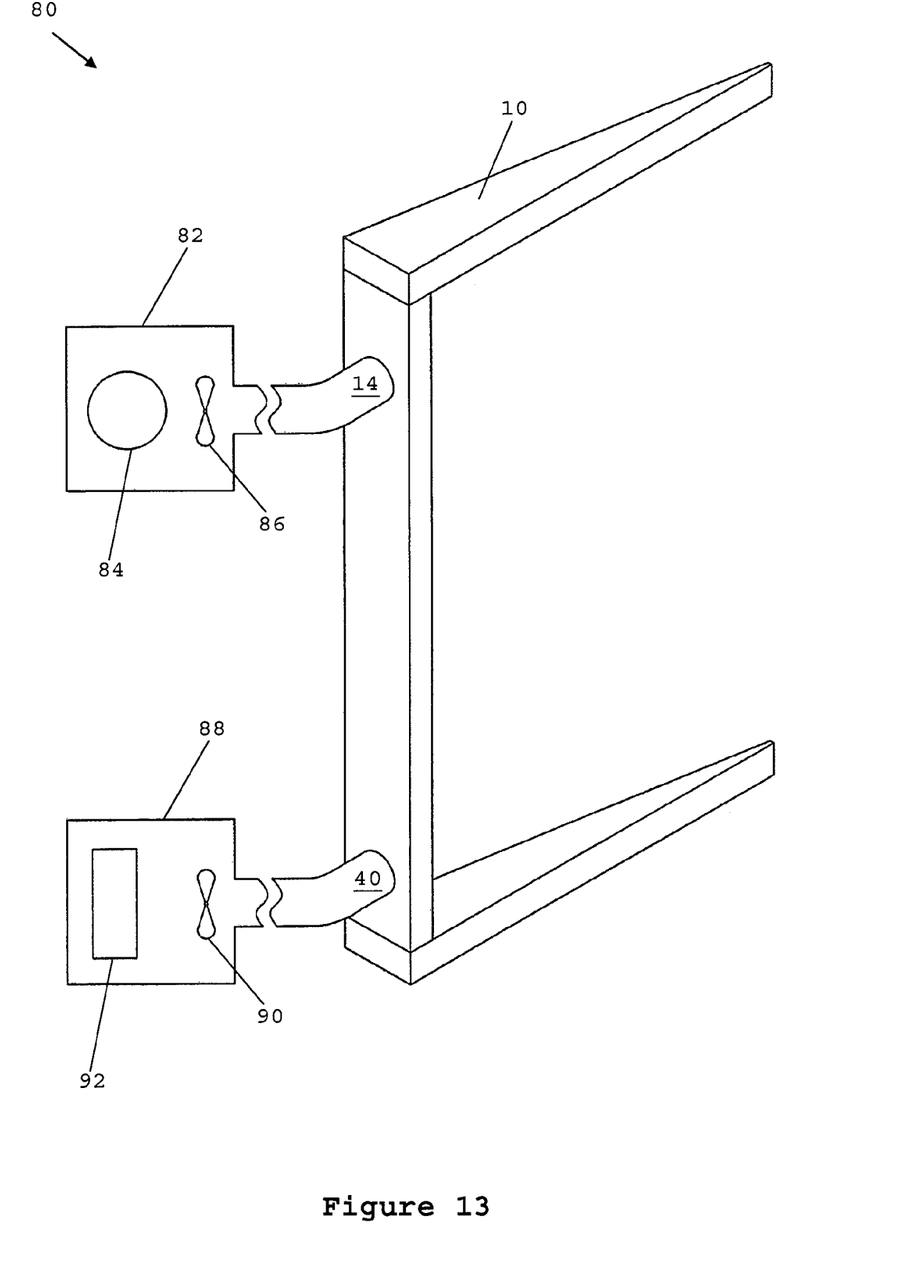
FIG. 13 shows a schematic view of an embodiment of a system.

FIG. 13 shows a schematic view of an embodiment of a system that is generally indicated by the numeral 80. This system may be used for fumigating a container such as an ISO shipping container or alternatively be used in some configurations to remove a residual gas such as residual fumigant from a structure, such as an ISO container. One version of the system has a device 10 and a fumigant source 82 in communication with the device. The fumigant source 82 has a vessel for holding the fumigant, for example methyl bromide, and a fan 86 which forces the fumigant from the vessel 84 through a passageway 14 into the structure. The system 80 also includes an extraction unit 88 in communication with the device 10 for drawing fumigant through a passageway 40. The extraction unit may comprise a fan 90 which draws gas from the structure. The extraction unit may comprise an activated carbon absorption bed in the form of a cartridge 92 for absorption of the fumigant (such as methyl bromide). The activated carbon filter cartridge may later be disposed of with the fumigant safely attached thereto. In alternative embodiments the extraction unit 88 vents the extracted residual gas to atmosphere.

In another configuration of the system 10 the system removes residual gas from a structure it is installed on. In this case, the passageway 14 may be in communication with the atmosphere such that air from the atmosphere can be drawn into the structure via the passageway 14. The extraction unit 88 may or may not have the carbon absorption bed cartridge.

In an alternative configuration, the extraction unit is configured to blow air from the atmosphere through 14 rather than draw it through 40. In this case, the extraction unit may be in communication with passageway 14 and passageway 40 is opened to the atmosphere.

Now that embodiments have been described, it will be appreciated that some embodiments have some of the following advantages:

a relatively light gas portal is provided which can be more easily installed on a structure;

the wedge shape of the device naturally accommodates the space between the opening and the ajar door, making it easier to form a gas tight seal;

an existing door of the structure is used instead of an additional panel which reduces the mass and number of components required to form a gas portal;

the device may be relatively inexpensive

Some variations on the specific embodiments include:

the device 10 may have more or less than 2 passageways;

the passageways may have a square, rectangular or any suitable arbitrary cross section;

sockets may be used, instead of or additional to projecting pipes, that external hoses may be connected to, such a sockets having a screw or even bayonet fitting;

the device may be adapted for use at the door of a silo, factory or any other suitable building;

the device may be adapted for use with an intermodal shipping container (which an ISO shipping container is an example of), such as a 20, 25 or 40 foot dry van or REFFER.

It will be appreciated that numerous variations and/or modifications may be made to the invention as shown in the specific embodiments without departing from the spirit or scope of the invention as broadly described. For example, the wedge members may be curved to conform to a curved exterior surface that may be presented by a silo or other structure. The perimeter of the wedge may deviate from the angular embodiments shown to complement a round hatch or any other closeable opening deviating from a rectangular form. The present embodiments are, therefore, to be considered in all respects as illustrative and not restrictive.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A shipping container fumigation apparatus for location between an opening of a shipping container and a door arranged to close the opening during a fumigation cycle, the door being attached to the shipping container at a pivot that is located adjacent to the opening, the apparatus comprising:
   a fumigant impervious wedge-shaped barrier configured to provide a gas tight seal in use, the barrier comprising two spaced apart wedge-shaped members and a portion that extends between and is attached to the wedge-shaped members, the barrier being configured such that, when the door is ajar, the barrier is able to locate in the opening and extend between the shipping container and the door so as to seal the opening during the fumigation cycle;
   a passageway through the barrier, the passageway providing a fumigant pathway during the fumigation cycle between an interior and an exterior of the shipping container.

2. The apparatus as defined by claim 1 wherein the two spaced apart wedge-shaped members are each arranged in the barrier to point in the same direction.

3. The apparatus as defined by claim 2, wherein the portion has opposite ends, each of the ends being attached adjacent to a thick end of a respective one of the two spaced apart wedge-shaped members to form the barrier into a C-like shape.

4. The apparatus as defined by claim 3 wherein the wedge-shaped members and the portion are configured, in combination, to provide a gas seal between the opening and the ajar door.

5. The apparatus as defined by either claim 3 wherein the passageway is located in the barrier in opposition to a thin end of each of the two spaced apart wedge-shaped members.

6. The apparatus as defined by claim 3 wherein the passageway passes through the portion.

7. The apparatus as defined by claim 3 wherein the passageway comprises a pipe, with at least part of the pipe projecting away from the barrier in a direction that is opposite to the direction of projection of the two spaced apart wedge-shaped members.

8. The apparatus as defined by claim 7 wherein the pipe comprises an extension which, when the barrier is located to extend between the opening and the door, is directed out of a plane of the wedge shaped member and into the interior of the shipping container.

9. The apparatus as defined by claim 8 wherein each of the two spaced apart wedge-shaped members and the portion comprises a stiffening element.

10. The apparatus as defined by claim 9 wherein the pipe is attached to one of the stiffening elements.

11. The apparatus as defined by claim 1 wherein two passageways are provided through the barrier, one of the passageways being a gas inlet for the introduction in use of a gas into the shipping container and the other passageway being a gas outlet for the extraction in use of a gas from the shipping container.

12. The apparatus as defined by claim 1 that is adapted to be assembled from component parts.

13. The apparatus as defined by claim 1 wherein the apparatus, when assembled, resembles a perimeter portion of a wedge.

14. A shipping container fumigation apparatus configured for location between an opening of a shipping container and a door arranged to close the opening during a fumigation cycle, the apparatus comprising:
   a fumigant impervious barrier configured to provide a gas-tight seal in use, the barrier comprising two spaced apart wedge-shaped members and a portion extending between and attached to the wedge-shaped members, the barrier being configured to extend between the shipping container and the door so as to seal the opening during the fumigation cycle;
   a passageway through the barrier, the passageway providing a fumigant pathway between an interior and an exterior of the shipping container.

15. The apparatus as defined by claim 14, wherein the barrier is wedge-shaped such that it is able to extend and seal between the opening and the door when the door is ajar.

16. A method of installing a fumigant portal on a shipping container, the method comprising the steps of:
   opening a door of the shipping container to reveal a shipping container end door opening;
   locating at the opening a fumigant impervious barrier, the barrier comprising two spaced apart wedge-shaped members and a portion that extends between and is attached to the wedge-shaped members, the barrier configured to be located in the opening between the shipping container and the door, the barrier having a passageway providing a fumigant pathway between an interior and an exterior of the container and a gas tight seal able to seal the opening during a fumigation cycle; and;
   closing the door until it abuts the barrier.

17. A method of installing a fumigant portal on a shipping container, the method comprising the steps of:
   opening a door attached to the shipping container at a pivot located adjacent to an opening of the shipping container to reveal the opening;
   locating apparatus as defined by claim 1 at the opening; and
   closing the door until it abuts the barrier.

18. A method of installing a fumigant portal on a shipping container, the method comprising the steps of:
   opening a door attached to the shipping container at a pivot located adjacent an opening of the shipping container to reveal the opening;
   locating apparatus defined by claim 14 or claim 15 at the opening; and
   closing the door until it abuts the barrier.

19. A fumigation system, the system comprising:
   the apparatus as defined by claim 1 or claim 14; and
   a fumigation source in communication with the apparatus.

20. A residual gas removal system, the system comprising:
the apparatus as defined by claim 1 or claim 14; and
a flushing fumigant unit in communication with the apparatus and configured to cause a flushing fumigant to flow through the passageway.

21. A shipping container fumigation apparatus comprising:
a fumigant impervious barrier comprising:
two spaced apart wedge-shaped members; and
a portion that extends between and is attached to the wedge-shaped members, the portion having opposite ends, each of the ends being attached adjacent to a thick end of a respective one of the two spaced apart wedge-shaped members;
wherein the fumigant impervious barrier is configured to provide a gas tight seal between a door of a shipping container and edges of an opening of the shipping container,
a passageway through the fumigant impervious barrier, the passageway providing a fumigant pathway during the fumigation cycle between an interior and an exterior of the shipping container.

22. The apparatus as defined by claim 21 wherein the passageway comprises a pipe, with at least part of the pipe projecting away from the fumigant impervious barrier in a direction that is opposite to the direction of projection of the two spaced apart wedge-shaped members.

23. The apparatus as defined by claim 21 wherein two passageways are provided through the fumigant impervious barrier, one of the passageways being a gas inlet for the introduction in use of a gas into the shipping container and the other passageway being a gas outlet for the extraction in use of a gas from the shipping container.

* * * * *